United States Patent
Ghosh et al.

(10) Patent No.: US 11,507,603 B2
(45) Date of Patent: Nov. 22, 2022

(54) IDENTIFYING UNCERTAIN CLASSIFICATIONS

(71) Applicant: BayesTree Intelligence Pvt Ltd., Santa Clara, CA (US)

(72) Inventors: Partha Pratim Ghosh, Bangalore (IN); Vijay Giri, Bangalore (IN); Girish Koppar, Bangalore (IN); Avijit Biswas, Bangalore (IN)

(73) Assignee: BayesTree Intelligence Pvt Ltd., Santa Clara, CA (US)

( * ) Notice: Subject to any disclaimer, the term of this patent is extended or adjusted under 35 U.S.C. 154(b) by 0 days.

(21) Appl. No.: 16/946,926

(22) Filed: Jul. 11, 2020

(65) Prior Publication Data
US 2021/0390122 A1  Dec. 16, 2021
US 2022/0229850 A9  Jul. 21, 2022

(30) Foreign Application Priority Data

May 12, 2020 (IN) .............................. 202041020016

(51) Int. Cl.
| | |
|---|---|
| G06F 16/28 | (2019.01) |
| G06F 16/23 | (2019.01) |
| G06F 16/245 | (2019.01) |
| G06N 20/00 | (2019.01) |

(52) U.S. Cl.
CPC ........ *G06F 16/285* (2019.01); *G06F 16/2365* (2019.01); *G06F 16/245* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 6,823,323 B2 | 11/2004 | Forman et al. |
| 6,976,207 B1 | 12/2005 | Ruján et al. |
| 8,024,413 B1 | 9/2011 | Kolcz |
| 9,104,968 B2 | 8/2015 | Wang |
| 2004/0120488 A1 | 6/2004 | Dempsey et al. |
| 2005/0021290 A1 | 1/2005 | Velipasaoglu et al. |
| 2006/0112038 A1 | 5/2006 | Luo |

(Continued)

FOREIGN PATENT DOCUMENTS

| | | | |
|---|---|---|---|
| CN | 109871896 A | * | 6/2019 |
| KR | 1020180047395 A | | 5/2018 |

OTHER PUBLICATIONS

Ko, H. et al., "A Survey of Recommendation Systems: Recommendation Models, Techniques, and Application Fields", Electronics (2022), 11, 141, 48 pages. Available at: https://doi.org/10.3390/electronics11010141, last accessed on: Mar. 23, 2022. (Year: 2022).*

*Primary Examiner* — Scott A. Waldron
(74) *Attorney, Agent, or Firm* — MG Miller Intellectual Property Law LLC

(57) ABSTRACT

An improvement of the functionality of a computerized automatic recommendation engine is provided. In particular, a method for identifying uncertain classifications made by a computerized recommendation engine through the utilization of historical solution data, such that they can be flagged for subsequent human review, thereby improving the training process for the recommendation engine, is disclosed.

6 Claims, 2 Drawing Sheets

(56) References Cited

U.S. PATENT DOCUMENTS

Figure 1:
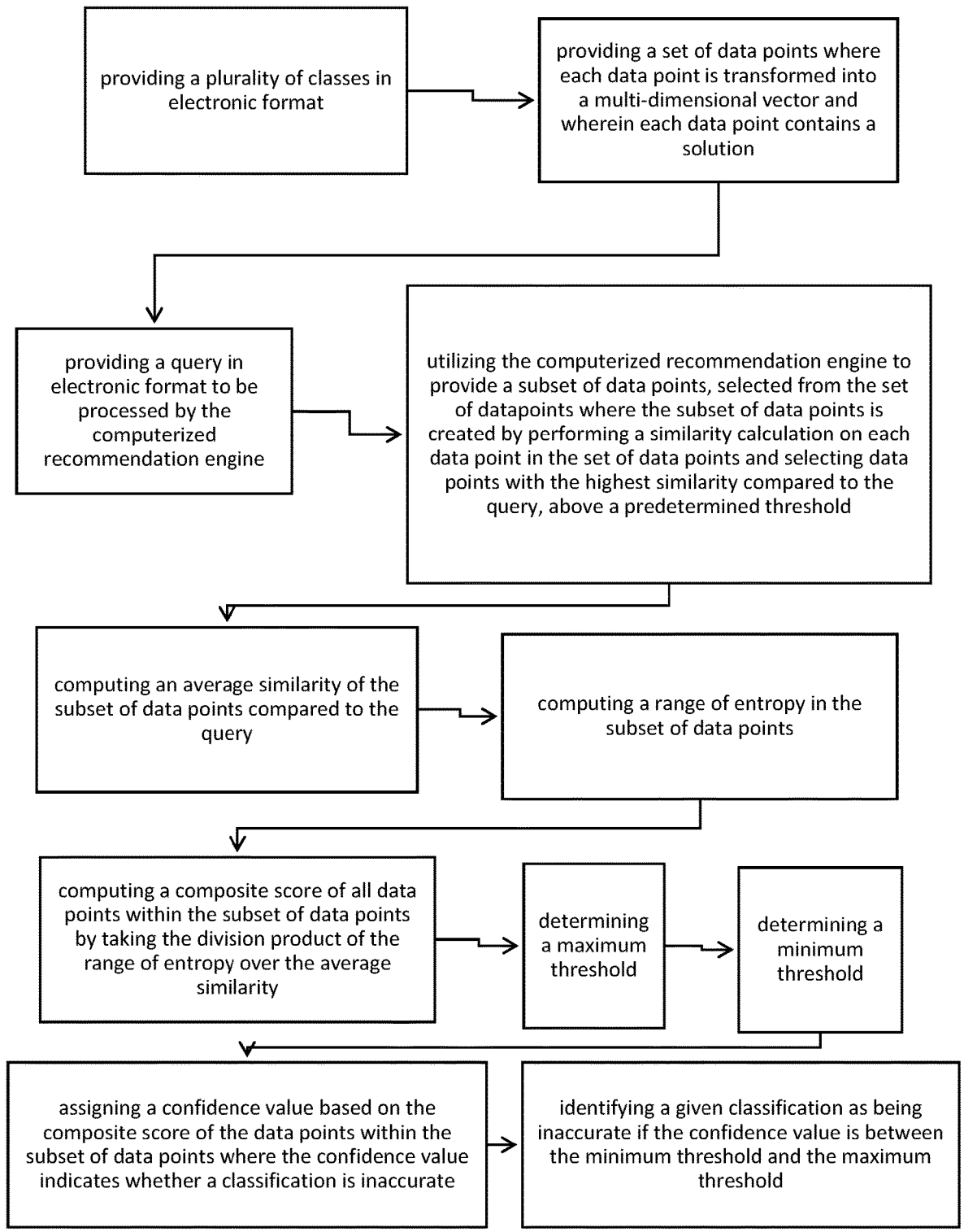
Figure 2:
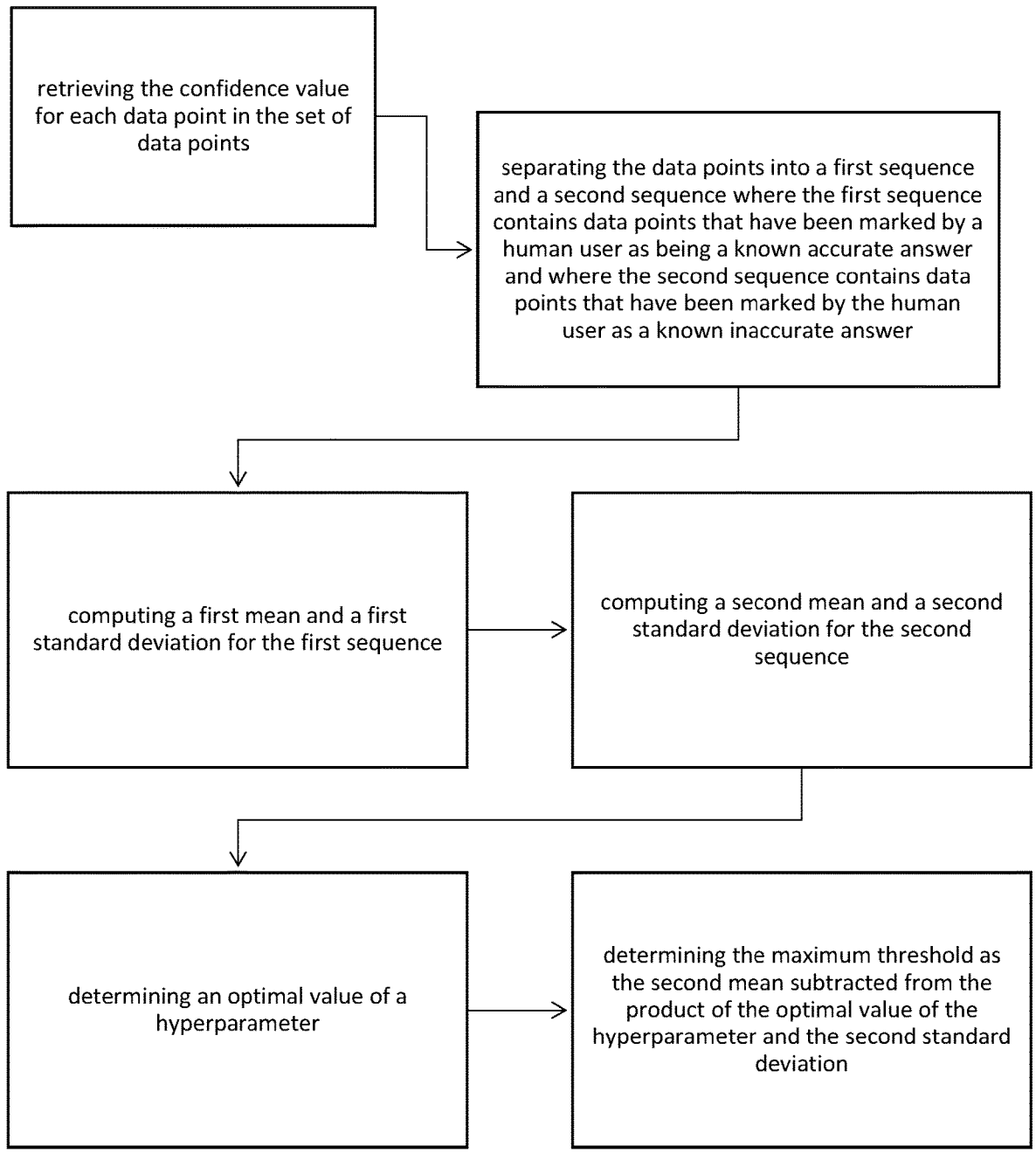

| | | | |
|---|---|---|---|
| 2009/0150308 A1* | 6/2009 | Wang | G06K 9/723 |
| | | | 706/12 |
| 2019/0163816 A1 | 5/2019 | Francis et al. | |
| 2020/0401855 A1* | 12/2020 | Kim | G06K 9/6221 |
| 2021/0125006 A1* | 4/2021 | Seo | G06K 9/46 |

* cited by examiner

IDENTIFYING UNCERTAIN CLASSIFICATIONS

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

CLAIM OF PRIORITY

This application claims the benefit of Indian Application No. 202041020016, filed on May 21, 2020, the content of which is hereby incorporated by reference in its entirety.

FIELD OF THE EMBODIMENTS

The present disclosure relates generally to improvement of the functionality of a computerized automatic recommendation engine. In particular, the present disclosure and the embodiments contained therein relate to a method for improving the resolution of queries tickets through the utilization of historical solution data obtained from multiple sources, by providing a methodology for automatically identifying uncertain classifications and recommendations such that they can be flagged for subsequent human review, thereby improving the training process.

BACKGROUND

Machine learning-based recommendation engines or recommendation systems offer a dramatic improvement over the old ways of doing things. By being able to selectively iterate through massive amount of data while performing a variety of similarity calculations, these systems are able to quickly and accurately provide known answers or potential answers contained within an attached database to an end-user.

However, while these systems are excellent at providing answers when the system is confident that the answer is correct, these systems struggle greatly at identifying recommendations having an uncertain level of confidence. That is, these systems are good at determining a known "good" answer or a known "bad" answer, but struggle with handling recommendations that do not fall neatly into those categories.

As the amount of information contained in databases attached to recommendations continues to grow, having a human identify all of uncertain recommendations within the database is impractical, if not impossible. As such, there is a need for a method that allows a computerized recommendation system to automatically determine which recommendations contained within an attached database have an uncertain level of confidence, so that they may be forwarded to a human for manual review, ultimately improving the performance of the recommendation engine.

SUMMARY

An aspect of an example embodiment in the present disclosure is to provide a method for identifying inaccurate classifications made by a computerized recommendation engine. The method begins by providing a plurality of classes in electronic format, where the classes are contained within the recommendation engine, as well as providing a set of data points, wherein each data point is transformed into a multi-dimensional vector and wherein each data point contains a solution. From there, a query in electronic format is provided, where the query is to be processed by the computerized recommendation engine. The computerized recommendation engine is then utilized to provide a subset of data points, selected from the set of datapoints, where the subset of data points is created by performing a similarity calculation on each data point in the set of data points and selecting data points with the highest similarity above a predetermined threshold. An average similarity of the subset of data points compared to the query is then computed, along with a range of entropy in the subset of data points. A composite score of all data points within the subset of data points is subsequently computed by taking the division product of the range of entropy over the average similarity. Preferably, the range of entropy is from 0 to 1, inclusive. A maximum threshold and a minimum threshold are determined. Then, a confidence value based on the composite score of the data points within the subset of data points, where the confidence value indicates whether the classification is inaccurate is calculated. Finally, a given classification is identified as being inaccurate if the confidence value is between the minimum threshold and the maximum threshold.

In a preferred embodiment, the maximum threshold is determined by retrieving a confidence value for each data point in the set of data points, then separating the data points into a first sequence and a second sequence, separating the data points into a first sequence and a second sequence, wherein the first sequence contains data points that have been marked by a human user as being a known accurate answer, wherein the second sequence contains data points that have been marked by the human user as a known inaccurate answer;

A first mean and first standard deviation for the first sequence are computed, as well as a second mean and a second standard deviation for the second sequence. From there an optimal value of a hyperparameter is determined, and the maximum threshold is determined as the second mean subtracted from the product of the optimal value of the hyperparameter and the second standard deviation.

In another preferred embodiment, the minimum threshold is determined by taking the first mean subtracted from the product of the optimal value of the hyperparameter and the first standard deviation. Preferably, the optimal value of the hyperparameter is less than the second mean minus the first mean, divided by the sum of the first standard deviation and the second standard deviation.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

DETAILED DESCRIPTION OF THE PREFERRED EMBODIMENTS

The present disclosure provides for a method for automatically identifying uncertain recommendations and classifications thereof made by a computerized recommendation engine. While the methodology contained herein may be used with a variety of artificial intelligence, machine learning, and recommendation engine system, said methodology is highly beneficial when applied to the technologies contained in U.S. patent application Ser. No. 16/634,656, the contents of which are hereby incorporated by reference in their entirety.

The method in accordance with the present disclosure begins by providing a plurality of classes in electronic format and a set of data points where each data point contained an answer, potential answer, or a solution and is transformed into a multi-dimension vector. The plurality of classes can be expressed by $C=\{C_i: i \in [1, |C|]\}$ and the set of data points can be expressed by $D=\{x_i: i \in [1, N], x_i \in R^d\}$, where $x_i \in R^d$ is a data point in d-dimensional space. A query, in electronic format, is then provided to the recommendation engine where the query has at least one field. The recommendation engine will then provide a subset of data points selected from the set of data points by performing a similarity calculation on each data point in the set of data points against the query and selecting the data points with their similarity calculation being above a predetermined threshold.

In a preferred embodiment, the similarity calculation is performed by the recommendation engine generating a plurality of inverted indices for the at least one field, and then extending the dimensions of the query are extended. A first similarity measure is then calculated for each of the plurality of inverted indices against each of the data points. The recommendation then joins each of the data points when their respective first similarity measure is above a threshold amount. The data points are then each extended to match the dimensions of the extended dimensions of the query. The recommendation engine then performs a second similarity measure of extended dimensions of the query with each field of the joined data points. Finally, the recommendation engine then provides the top x results of the data points based on a composite of the first similarity measure and the second similarity measure, sampled from the top (x*a) results of the plurality of potential answers, where a is an integer multiple of x.

For any given data point, $x \in R^d$, the recommendation engine will report the probabilities of the classes in the set of classes C as a probability vector $\hat{p}=\{p_1, p_2, \ldots, p_{|C|}\}$, such that, $\Sigma_{i=1}^{|C|} p_i = 1$. After the subset of similarity measures for the data points $\{s_1, \ldots s_K\}$ has been generated, an average similarity of the subset is computed using the following equation: $\langle s \rangle = \Sigma_{i=1}^{K} p_i * s_i$.

A range of entropy for the subset of data points is then defined. To determine the range of entropy in the subset of data points, the entropy of the subset may be calculated as $E=-\Sigma_{i=1}^{|C|} p_i * \ln(p_i)$, which would result in the maximum entropy $E_{max}$, being equal to $\ln(|C|)$. Thus, the range of entropy will be defined as $$E_{range} = \frac{E}{E_{max}}, E_{range} \in [0, 1].$$

A composite score of all the data points within the subset is then calculated by dividing the range of entropy $E_{range}$ by the average similarity $\langle s \rangle$.

From there a maximum threshold, $\theta_{bad}$ and minimum threshold, $\theta_{good}$ must be determined. Preferably, these thresholds are determined automatically from the historical data contained in the database of the recommendation engine. To do this, a hyperparameter, k must be determined. To determine 1K, the data points from the set of historical data points must have a label retrieved, where the label indicates whether the data point provided an accurate solution or an inaccurate solution. The data points are then split into two groups, or sequences, one group containing all of the data points that have been marked by a human user as being a known accurate answer, the second group containing all of the data points that have been marked by a human user as being a known inaccurate answer. A first mean $\mu_{good}$, and a first standard deviation $\sigma_{good}$ are prepared from taking the mean and standard deviation of the composite scores of the first group, and a second mean $\mu_{bad}$ and a second standard deviation $\sigma_{bad}$ are prepared from taking the mean and standard deviation of the composite scores of the second group. With these values defined, the hyper parameter k results in the following inequality is created $$k < \frac{\mu_{bad} - \mu_{good}}{\sigma_{bad} + \sigma_{good}}$$

and a limit of the subset is defined as $$LT = \frac{\mu_{bad} - \mu_{good}}{\sigma_{bad} + \sigma_{good}}.$$

To determine the optimal value of the hyperparameter $k_{opt}$, the following chart is used:

| LT | $k_{opt}$ |
|---|---|
| ≥3 | 3 |
| [≥2, <3] | 2 |
| [≥0, <2] | 3 |

Once the optimal hyperparameter has been determined, the recommendation engine tests whether the following inequality is true: $(\mu_{good}+k_{opt}*\sigma_{good}) < (\mu_{bad}-k_{opt}*\sigma_{bad})$. If this is true then $\theta_{good}=(\mu_{good}+k_{opt}*\sigma_{good})$ and $\theta_{bad}=(\mu_{bad}-k_{opt}*\sigma_{bad})$. If the inequality is not true, then subset of data points must be expanded until the inequality becomes true. If the subset of data points cannot be expanded to make the inequality true, the method fails, and an error message is returned to the end user.

After the maximum threshold and minimum thresholds have been determined, a confidence value is assigned to the subset. If the composite score is in between the minimum threshold and the maximum threshold, you know the answer, potential answer, or classification provided by the recommendation engine cannot be trusted and must be forwarded to a human user for review and manual marking.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, "a first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is the present disclosure that relates generally to improvement of the functionality of a computerized automatic recommendation engine. In particular, the present disclosure and the embodiments contained therein relate to a method for improving the resolution of queries tickets through the utilization of historical solution data obtained from multiple sources, by providing a methodology for automatically identifying uncertain classifications and recommendations such that they can be flagged for subsequent human review, thereby improving the training process.

The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for identifying uncertain classifications made by a computerized recommendation engine, comprising the steps of:

provviding a plurality of classes in electronic format made by an artificial intelligence-based computerized recommendation engine;

providing a set of data points, wherein each data point is transformed into a multi-dimensional vector and wherein each data point contains a solution;

providing a query in electronic format to be processed by the artificial intelligence-based computerized recommendation engine;

utilizing the artificial intelligence-based computerized recommendation engine to provide a subset of data points, selected from the set of datapoints, wherein the subset of data points is created by performing a similarity calculation on each data point in the set of data points and selecting data points with the highest similarity compared to the query, above a predetermined threshold;

computing an average similarity of the subset of data points compared to the query;

computing a range of entropy in the subset of data points;

computing a composite score of all data points within the subset of data points by taking the division product of the range of entropy over the average similarity;

determining a maximum threshold for a confidence value;

determining a minimum threshold for the confidence value; and assigning the confidence value based on the composite score of the data points within the subset of data points, wherein the confidence value indicates whether a classification to a class is inaccurate;

identifying a given classification to a class made by the artificial intelligence-based recommendation engine as being inaccurate when the confidence value is between the minimum threshold and the maximum threshold.

2. The method of claim 1, the step of "determining a maximum threshold for a confidence value" comprises the steps of:

retrieving a historical confidence value for each data point in a set of historical data points;

separating the data points in the set of historical data points into a first sequence and a second sequence, wherein the first sequence contains data points that have been marked by a human user as being a known accurate answer, wherein the second sequence contains data points that have been marked by the human user as a known inaccurate answer;

computing a first mean and a first standard deviation for the historical confidence values in the first sequence;

computing a second mean and a second standard deviation for the historical confidence values in the second sequence;

determining an optimal value of a hyperparameter; and determining the maximum threshold for a confidence value by subtracting the product of the optimal value of the hyperparameter and the second standard deviation from the second mean.

3. The method of claim 2, the step of "determining a minimum threshold for the confidence value" comprises the step of:

determining the minimum threshold for the confidence value as the first mean added to the product of the optimal value of the hyperparameter and the first standard deviation.

4. The method of claim 3, wherein the optimal value of the hyperparameter is less than the second mean minus the first mean, divided by the sum of the first standard deviation and the second standard deviation.

5. The method of claim 4, wherein the range of entropy is between 0 and 1, inclusive.

6. A method for identifying uncertain classifications made by a computerized recommendation engine, comprising the steps of:

providing a plurality of classes in electronic format made by an artificial intelligence-based computerized recommendation engine;

providing a set of data points, wherein each data point is transformed into a multi-dimensional vector and wherein each data point contains a solution;

providing a query in electronic format to be processed by the artificial intelligence-based computerized recommendation engine;

utilizing the artificial intelligence-based computerized recommendation engine to provide a subset of data points, selected from the set of datapoints,
wherein the subset of data points is created by performing a similarity calculation on each data point in the set of data points and selecting data points with the highest similarity compared to the query, above a predetermined threshold;

computing an average similarity of the subset of data points compared to the query;

computing a range of entropy in the subset of data points;

computing a composite score of all data points within the subset of data points by taking the division product of the range of entropy over the average similarity;

determining a maximum threshold for a confidence value;

determining a minimum threshold for the confidence value; and assigning the confidence value based on the composite score of the data points within the subset of data points, wherein the confidence value indicates whether a classification to a class is inaccurate; and identifying a given classification to a class made by the artificial intelligence-based recommendation engine as being inaccurate when the confidence value is between the minimum threshold and the maximum threshold wherein the step of determining a maximum threshold for a confidence value comprises the steps of:

retrieving a historical confidence value for each data point in a set of historical data points;

separating the data points in the set of historical data points into a first sequence and a second sequence, wherein the first sequence contains data points that have been marked by a human user as being a known accurate answer, wherein the second sequence contains data points that have been marked by the human user as a known inaccurate answer;

computing a first mean and a first standard deviation for the historical confidence values in the first sequence;

computing a second mean and a second standard deviation for the historical confidence values in the second sequence;

determining an optimal value of a hyperparameter; and determining the maximum threshold for a confidence value by subtracting the product of the optimal value of the hyperparameter and the second standard deviation from the second mean, and wherein the step of determining a minimum threshold for the confidence value comprises the step of:

determining the minimum threshold for the confidence value as the first mean added to the product of the optimal value of the hyperparameter and the first standard deviation.

* * * * *